(12) United States Patent
Albasheir et al.

(10) Patent No.: US 12,063,592 B2
(45) Date of Patent: *Aug. 13, 2024

(54) USER PLANE SYSTEM SELECTION BASED ON LATENCY

(71) Applicant: T-Mobile USA, Inc., Bellevue, WA (US)

(72) Inventors: Suliman Albasheir, Issaquah, WA (US); Salvador Mendoza, Issaquah, WA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/153,755

(22) Filed: Jan. 20, 2021

(65) Prior Publication Data

US 2021/0144632 A1 May 13, 2021

Related U.S. Application Data

(63) Continuation of application No. 16/144,628, filed on Sep. 27, 2018, now Pat. No. 10,904,827.

(51) Int. Cl.
| | |
|---|---|
| *H04W 48/18* | (2009.01) |
| *H04L 43/0852* | (2022.01) |
| *H04L 65/1016* | (2022.01) |
| *H04W 12/06* | (2021.01) |
| *H04W 24/10* | (2009.01) |

(Continued)

(52) U.S. Cl.
CPC ......... *H04W 48/18* (2013.01); *H04L 43/0852* (2013.01); *H04L 65/1016* (2013.01); *H04W 12/06* (2013.01); *H04W 24/10* (2013.01); *H04W 76/10* (2018.02); *H04W 80/10* (2013.01)

(58) Field of Classification Search
None
See application file for complete search history.

(56) References Cited

U.S. PATENT DOCUMENTS

| | | | |
|---|---|---|---|
| 10,285,155 B1 * | 5/2019 | Dodd-Noble | ......... H04W 4/029 |
| 2018/0063752 A1 | 3/2018 | Hahn et al. | |
| 2018/0227743 A1 | 8/2018 | Faccin et al. | |

(Continued)

FOREIGN PATENT DOCUMENTS

WO    WO2018086674    5/2018

OTHER PUBLICATIONS

Extended European Search Report mailed Jun. 22, 2022 for European Patent Application No. 19864361.1, 10 pages.

(Continued)

*Primary Examiner* — Walter J Divito
(74) *Attorney, Agent, or Firm* — Lee & Hayes, P.C.

(57) ABSTRACT

Systems, devices, and techniques described herein relate to user plane system selection based on latency in mobile networks. In particular, the systems, devices, and techniques can be implemented in fifth generation (5G) mobile networks to provide selection of a user plane function (UPF) based on latency. The UPF can measure a latency toward an access network and provide an indication of the latency to a policy control function (PCF). The PCF can select the UPF based on the indication and can request the UPF to provide services to a user equipment (UE) originating a priority request. In response, the UPF can provide services to the UE.

20 Claims, 8 Drawing Sheets

(51) Int. Cl.
*H04W 76/10* (2018.01)
*H04W 80/10* (2009.01)

(56) References Cited

U.S. PATENT DOCUMENTS

| 2018/0262924 | A1 | 9/2018 | Dao et al. |
| 2018/0324576 | A1 | 11/2018 | Salkintzis |
| 2019/0254083 | A1 | 8/2019 | Stammers et al. |
| 2019/0357130 | A1 | 11/2019 | Garcia Azorero et al. |
| 2020/0107253 | A1 | 4/2020 | Albasheir et al. |
| 2020/0374946 | A1* | 11/2020 | Bedekar ................ H04W 76/12 |
| 2021/0410010 | A1* | 12/2021 | Salkintzis ............. H04W 76/10 |

OTHER PUBLICATIONS

Huawei et al, "Reduce Latency to Setup the User Plane", S2-187024, SA WG2 Meeting #128, Vilnius, Lithuania, Jul. 6, 2018, 3 pages.
Office Action for U.S. Appl. No. 16/144,628, mailed on May 20, 2020, Albasheir, "User Plane System Selection Based on Latency", 11 Pages.
PCT Search Report and Written Opinion mailed on Dec. 20, 2019 for PCT Application No. PCT/US2019/048856, 12 pages.

* cited by examiner

USER PLANE SYSTEM SELECTION BASED ON LATENCY

CROSS REFERENCE TO RELATED APPLICATIONS

This is a continuation application which claims priority to commonly assigned, co-pending U.S. patent application Ser. No. 16/144,628, filed Sep. 27, 2018. Application Ser. No. 16/144,628 is fully incorporated herein by reference.

BACKGROUND

Modern terrestrial telecommunication systems include heterogeneous mixtures of second, third, and fourth generation (2G, 3G, and 4G) cellular-wireless access technologies, which can be cross-compatible and can operate collectively to provide data communication services. Global Systems for Mobile (GSM) is an example of 2G telecommunications technologies; Universal Mobile Telecommunications System (UNITS) is an example of 3G telecommunications technologies; and Long Term Evolution (LTE), including LTE Advanced, and Evolved High-Speed Packet Access (HSPA+) are examples of 4G telecommunications technologies. Moving forward, future telecommunications systems may include fifth generation (5G) cellular-wireless access technologies, among other forthcoming technologies, to provide improved bandwidth and decreased response times to a multitude of devices that may be connected to a network.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
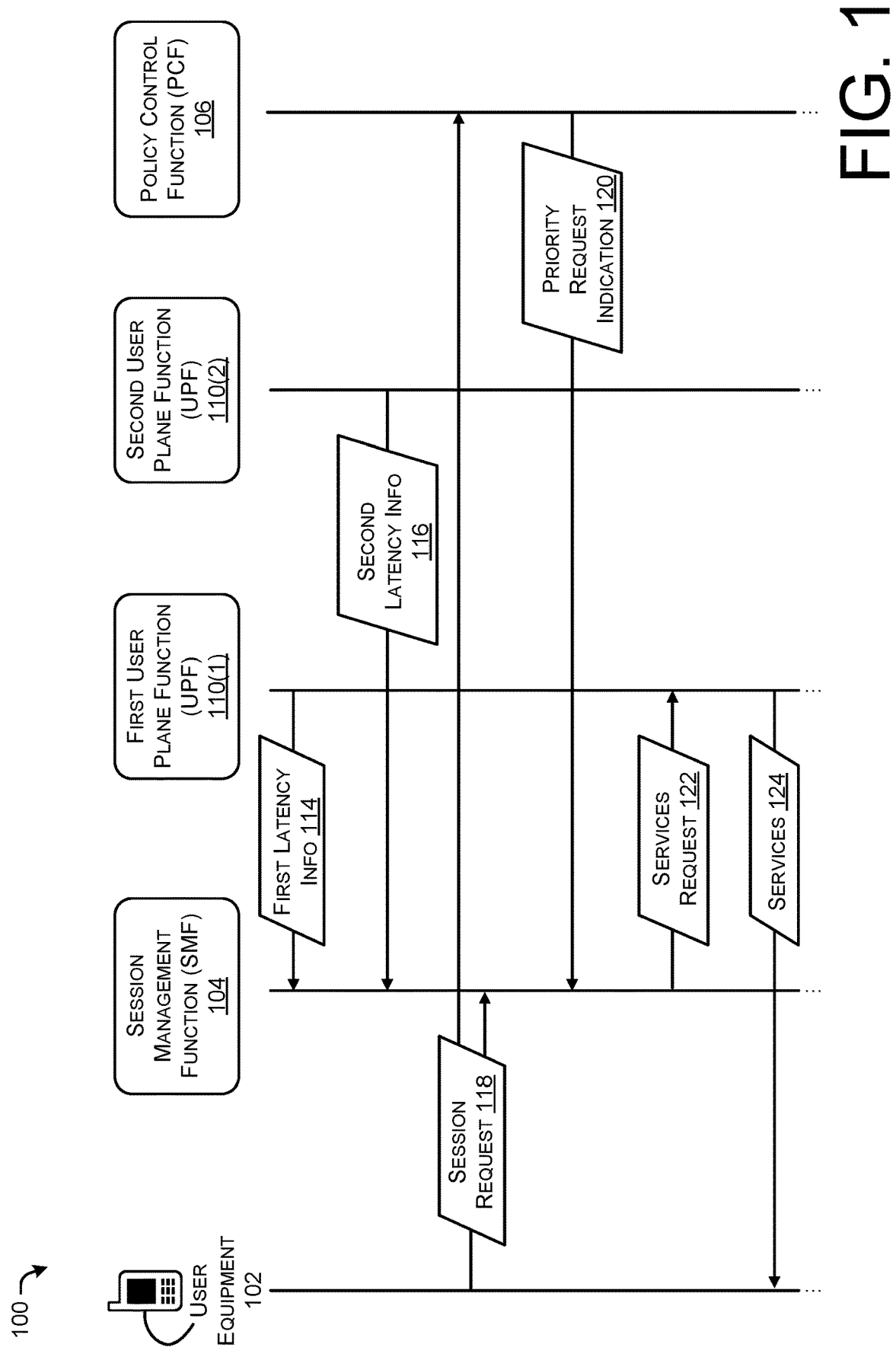
FIG. 1 is a diagram illustrating example signaling between a user equipment (UE) and various components of a mobile network, such as a fifth generation (5G) mobile network, as described herein.

The systems, devices, and techniques described herein relate to user plane system selection based on latency in mobile networks. In particular, the systems, devices, and techniques can be implemented in fifth generation (5G) mobile networks to provide intelligent selection of a user plane function (UPF) based on latency.

Mobile networks can support priority communications that require low latencies. For example, an emergency phone call may be prioritized in a mobile network by routing the emergency phone call to a UPF in closest proximity to the originating UE. However, the UPF in the closest proximity to the originating UE may be associated with a higher latency than other available UPFs in the mobile network. For example, the closest-proximity UPF may be experiencing high congestion, a hardware malfunction, or some other problem, which slows down traffic routed through the UPF. As a result, selecting a UPF based on proximity alone, does not necessarily prioritize latency-sensitive communications effectively.

Embodiments of the present disclosure address this problem by measuring and considering latencies in the selection of UPFs, particularly for latency-sensitive communications. For example, multiple user plane systems (e.g., multiple UPFs or multiple combinations of a serving gateway-U (SGW-U) node and a packet data network (PDN) gateway-U (PGW-U) node) can each measure a latency over a link toward an access network and report the latency to a signaling system (e.g., a session management function (SMF) or a packet data network (PDN) gateway-C (PGW-C)). When the signaling system learns or is otherwise informed (e.g., from a policy control function (PCF) or a policy and charging rules function (PCRF)) that a given session request is a priority request, the signaling system can select the lowest-latency user plane system based on the reported latencies, and request the lowest-latency user plane system to carry data traffic between a data network and the UE originating the session request.

The systems, devices, and techniques described herein can improve a functioning of a network by routing latency-sensitive traffic through a user plane system capable of providing the fastest services from a data network, even when the closest user plane system is experiencing relatively high latency. This and other improvements to the functioning of a computer and network are discussed herein.

The various functions, gateways, nodes, and components discussed herein can be implemented either as a network element on a dedicated hardware, as a software instance running on a dedicated hardware, or as a virtualized function instantiated on an appropriate platform, such as a cloud infrastructure.

The system, devices, and techniques described herein can be applied to selecting any function in a mobile network based at least in part on latency. For example, various components of a fifth generation (5G) mobile network can include, but are not limited to, a network exposure function (NEF), a network resource function (NRF), an authentication server function (AUSF), an access and mobility management function (AMF), a policy control function (PCF), a session management function (SMF), a unified data management (UDM) function, a user plane function (UPF), and/or an application function (AF). For example, some or all of the functions discussed herein can provide latency information, a session request, an indication of a priority request, etc., associated with the various functions to a session management function (SMF) (or other component), for example, such that the SMF or other component can select a particular function of a plurality of possible functions or components providing the same function based on a latency of the particular component. Thus, the system, devices, and techniques broadly apply to selecting network functions, and is not limited to a particular context or function, as discussed herein.

As used herein, the term "priority," or its equivalents, can refer to a type of request for services that are destined for a low-latency path. For example, a priority request can be a request for latency-sensitive communication, a request originating from a UE associated with a premium subscription account, or both.

As used herein, the term "latency-sensitive," or its equivalents, can refer to a type of communication that is indicated as being destined for a low-latency path. For example, latency-sensitive data traffic can include any of emergency service services (e.g., E911), live streaming video, and so on.

As used herein, the term "signaling system," or its equivalents, can refer to a system in a network configured to select user plane systems that carry data traffic through the network. For example, a signaling system can be or include a session management function (SMF). In another example, a signaling system can be or include a packet data network (PDN) gateway-C (PGW-C).

As used herein, the term "user plane system," or its equivalents, can refer to a system in a network configured to provide services from a data network to a UE. For example, a user plane system can be or include a user plane function (UPF). In another example, a user plane system can include a serving gateway-U (SGW-U), a packet data network (PDN) gateway-U (PGW-U), or a combination thereof.

As used herein, the term "proximity," or its equivalents, can refer to a geographic distance of a communication path between two nodes in a network. For example, a first user plane function (UPF) can be in closer proximity to a UE than a second UPF when a distance along a routing path between the first UPF and the UE is shorter than a distance along a routing path between the second UPF and the UE.

As used herein, the term "latency," or its equivalents, can refer to a temporal delay that occurs when at least one packet is transferred between at least two nodes in a network. For example, a latency associated with a user plane function (UPF) can be a round trip time (RTT) or a one-way delay (OWD) of at least one packet transmitted between the UPF node and another node in the same network as the UPF.

The systems, devices, and techniques described herein can be implemented in a number of ways. Example implementations are provided below with reference to the following figures.

FIG. 1 is a diagram illustrating example signaling 100 between a user equipment (UE) and various components of a mobile network, such as a fifth generation (5G) mobile network, as described herein. As illustrated, the signaling 100 includes interactions between a user equipment (UE) 102, a session management function (SMF) 104, a policy control function (PCF) 106, a first user plane function (UPF) 110(1), and a second user plane function (UPF) 110(2). As can be understood in the context of this disclosure, the example signaling 100 is not limited to the components described in FIG. 1, and can include other components and operations.

In general, the UE 102 can be implemented as any suitable type of computing device configured to communicate over a wired or wireless network, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), an internet-of-things (IoT) device, an in-vehicle (e.g., in-car) computer, and/or any similar mobile device, as well as situated computing devices including, without limitation, a television (smart television), set-top-box (STB), desktop computer, an IoT device, and the like.

In general, the SMF 104 can be implemented as a network function including functionality to manage communication sessions by and between UEs, and/or to provide internet protocol (IP) addresses to the UEs. In some instances, the SMF 104 can select a lowest-latency UPF to provide services to the UE 102 in response to receiving a priority request from the UE 102, as discussed herein.

In general, the PCF 106 can be implemented as a network function including functionality to support unified policy framework to govern network behavior, provide policy rules to control plane functions and/or enforce such rules, and/or implement a front end to access subscription information relevant for policy decisions in a data repository. In some embodiments, the PCF 106 can determine and report whether a session request is a priority request.

In general, each of the first and second UPFs 110(1) and 110(2) can be implemented as a network function including functionality to control data transfer between the UE 102 and the various components of the network. In some instances, the UPF 110 can include functionality to act as an anchor point for radio access technology (RAT) handover (e.g., inter and intra), external protocol data unit (PDU) session point of interconnect to a data network (e.g., the internet), packet routing and forwarding, packet inspection and user plane portion of policy rule enforcement, traffic usage reporting, traffic routing, Quality of Service (QoS) handling for user plane (e.g., packet filtering, gating, uplink/downlink rate enforcement), uplink traffic verification, transport level packet marking in the uplink and downlink, downlink packet buffering and downlink data notification triggering, and the like. As can be understood in the context of this disclosure, there may be one or more UPFs in addition to UPFs 110(1) and 110(2), which are associated with a network and/or with the UE 102.

Turning to the signaling 100, the first UPF 110(1) can transmit first latency information 114 to the SMF 104. The first latency information 114 can indicate a latency measured by the first UPF 110(1) over a path that includes the first UPF 110(1) and an access network. According to various embodiments, the access network can be between the first UPF 110(1) and the UE 102, such that the access network is in a data traffic pathway between the first UPF 110(2) and the UE 102. In some instances, the first latency information 114 includes an identification of the first UPF 110(1), as well as an indication of the latency measured between the first UPF 110(1) and the access network. For example, the first latency information 114 can be a data packet including an IP address of the first UPF 110(1) in a header and an indication of the latency measured by the first UPF 110(1) in a payload.

At a same or different time as first UPF 110(1) transmitting the first latency information 114, the second UPF 110(2) can transmit second latency information 116 to the SMF 104. The second latency information 116 can indicate a latency measured by the second UPF 110(2) over a path that includes the second UPF 110(2) and an access network. According to various embodiments, the access network can be between the second UPF 110(2) and the UE 102, such that the access network is in a data traffic pathway between the second UPF 110(2) and the UE 102. The access network used to generate the second latency information 116 can be the same as or different from the access network used to generate the first latency information 114. In some instances, the second latency information 116 includes an identification of the second UPF 110(2), as well as an indication of the latency measured between the second UPF 110(2) and the access network. For example, the second latency information 116 can be a data packet including an IP address of the second UPF 110(2) in a header and an indication of the latency measured by the second UPF 110(2) in a payload.

In some implementations, the first UPF 110(1) and the second UPF 110(2) periodically generate and transmit the first latency information 114 and the second latency information 116, respectively. Since latencies measured by the first and second UPFs 110(1) and 110(2) can vary due to temporary conditions experienced by the first and second UPFs 110(1) and 110(2) (e.g., temporary congestion), periodically transmitting the first and second latency information 114 and 116 can enable the first and second UPFs 110(1) and 110(2) to report relatively up-to-date latencies to the SMF.

In some embodiments, the first latency information 114 is based on ongoing measurements made by the first UPF 110(1), and the second latency information 116 is based on ongoing measurements made by the second UPF 110(2). For example, each one of the first and second UPFs 110(1) and 110(2) generates latency information by periodically pinging a radio access network (RAN). An example of this process is discussed below with reference to FIG. 4.

The UE 102 can transmit a session request 118 to the SMF 104. In some instances, the session request 118 is a data packet that is forwarded from the UE 102 to the SMF 104 from an access and mobility management function (AMF) (not shown). The session request can include a request for services from a data network. In some instances, the session request 118 can include a request to initiate a voice communication, a video communication, a data communication, and the like, by and between the UE 102 and other services or devices in the network.

The session request 118 can also be transmitted to the PCF 106. In some instances, the session request 118 is forwarded to the PCF 106 from the AMF. The PCF 106 can determine whether the session request 118 is a priority request based on information in the session request 118. For example, the PCF 106 can determine whether information in the session request 118 indicates the session request 118 is a request for latency-sensitive services. Latency-sensitive services can include, for example, emergency services (e.g., E911), live video streaming services, and the like. In an embodiment, the PCF 106 can determine that the session request 118 is a priority request by comparing the session request 118 with subscription information to determine whether the UE 102 originating the session request is associated with a premium subscription. For example, subscription information may indicate that a user account associated with the UE 102 has enrolled in a premium subscription with a mobile network that entitles the UE 102 to prioritized communication over the network.

The SMF 104 can learn or can otherwise determine whether the session request 118 is a priority request from the PCF 106. Upon determining the session request 118 is a priority request, the PCF 106 can transmit a priority request indication 120 to the SMF 104. The priority request indication 120 can inform the SMF 104 that the session request 118 is a priority request. In some instances, the priority request indication 120 is a data packet.

When the SMF 104 receives the priority request indication 120, a lowest-latency function can be triggered at the SMF 104. In some instances, the SMF 104 can determine which of the first and second UPFs 110(1) and 110(2) is the lowest-latency UPF by comparing the first and second latency information 114 and 116. In the example illustrated in FIG. 1, the SMF 104 determines that the first UPF 110(1) is associated with a lower latency than the second UPF 110(2).

The SMF 104 can transmit a services request 122 to the first UPF 110(1). In some instances, the services request 122 can be a data packet that includes a field indicating an identifier of the UE 102, e.g., an IP address of the UE 102.

At least partially in response to the services request 122, the first UPF 110(1) can provide services 124 to the UE 102. As discussed herein, the first UPF 110(1) can facilitate data transfer to and/or from the UE 102 to facilitate communications such as voice communications, video communications, data communications, etc.

In accordance with various embodiments described herein, the terms "user equipment (UE)," "user device," "wireless communication device," "wireless device," "communication device," "mobile device," and "client device," can be used interchangeably herein to describe any UE (e.g., the UE 102) that is capable of transmitting/receiving data wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), New Radio (NR), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), VoLTE, Institute of Electrical and Electronics Engineers' (IEEE) 802.1x protocols, WiMAX, Wi-Fi, Data Over Cable Service Interface Specification (DOCSIS), digital subscriber line (DSL), and/or any future IP-based network technology or evolution of an existing IP-based network technology.

In general, a user can further utilize the UE 102 to communicate with other users and associated UEs via an IP Multimedia Subsystem (IMS) core (sometimes referred to as the "IMS core network," the "IMS network," the "Core Network (CN)," or the "IM CN Subsystem"). IMS is an architectural framework defined by the $3^{rd}$ Generation Partnership Project (3GPP) for delivering Internet Protocol (IP) multimedia to a UE, such as the UE 102. The IMS core can be maintained and/or operated by one or more service providers, such as one or more wireless carriers ("carriers"), that provide IMS-based services to users who are associated with UEs, such as the UE 102. For example, a service provider can offer multimedia telephony services that allow a user to call or message other users via the IMS core using his/her UE. A user can also utilize an associated UE to receive, provide, or otherwise interact with various different IMS-based services by accessing the IMS core. It is to be appreciated that any number of base stations and/or IMS nodes can be included in the IMS network.

Accordingly, an operator of the IMS core can offer any type of IMS-based service, such as, telephony services, emergency services (e.g., E911), gaming services, instant messaging services, presence services, video conferencing services, social networking and sharing services, location-based services, push-to-talk services, and so on. In order to access these services (e.g., telephony services), a UE is configured to request establishment of a communication session. In the case of telephony services, the communication session can comprise a call (e.g., a voice-based communication session, such as a VoLTE call, or a Wi-Fi call).

The UE 102 is configured to utilize various radio access networks (RANs) in order to access the IMS core. In general, the IMS core is agnostic to the access technology that is used to connect a UE to the IMS core. In this manner, the UE 102 can connect to the IMS core via a 3GPP RAN, such a GSM/EDGE RAN (GERAN), a Universal Terrestrial RAN (UTRAN), or an evolved UTRAN (E-UTRAN), or alternatively, via a "non-3GPP" RAN, such as a Wi-Fi RAN, or another type of wireless local area network (WLAN) that is based on the IEEE 802.11 standards. Accessing the IMS core through a Wi-Fi access network typically involves the UE 102 communicating with the IMS core through a Wi-Fi access point (AP). Providing access to the IMS core through non-3GPP RANs has opened the door to recent advancements in IMS-based services, such as the introduction of Wi-Fi calling, which allows users to initiate and receive calls over an available Wi-Fi AP. Environments can include any number and type of base stations representing any number and type of macrocells, microcells, picocells, or femtocells, for example, with any type or amount of overlapping coverage or mutually exclusive coverage. Additional details of an example network and aspects of the function selection are discussed below in connection with FIG. 2.

Figure 2:
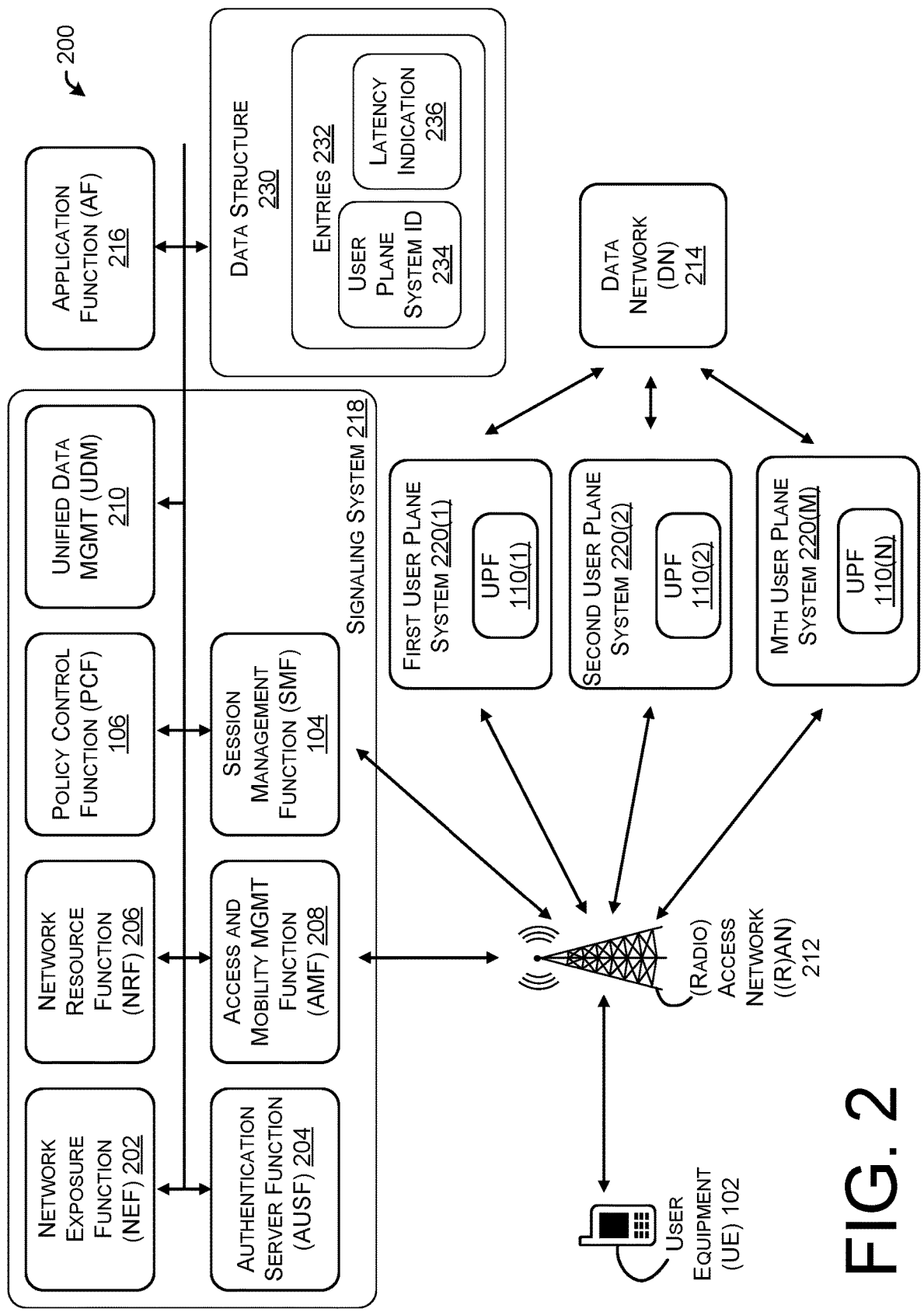
FIG. 2 illustrates an example environment including a UE and various components implementing user plane function selection based on latency, as described herein.

FIG. 2 illustrates an example environment 200 including a UE and various components implementing user plane function selection based on latency, as described herein. For example, the environment 200 includes the user equipment (UE) 102, the session management function (SMF) 104, the policy control function (PCF) 106, and user plane functions (UPFs) 110(1), 110(2), . . . , 110(N) (where N is an integer), as discussed in connection with FIG. 1, as well as a network exposure function (NEF) 202, an authentication server function (AUSF) 204, a network resource function (NRF) 206, an access and mobility management function (AMF) 208, a unified data management (UDM) 210, an application (AF) 216, a (radio) access network ((R)AN) 212, and a data network (DN) 214. A signaling system 218 can include the NEF 202, the AUSF 204, the NRF 206, the AMF 208, the PCF 106, the SMF 104, and the UDM 210. The UPFs 110(1), 110(2), . . . , 110(N) may be respectively included in user plane systems 220(1), 220(2), . . . , 220(M) (where M is an integer that can be equal to N). The environment 200 may further include a data structure 230 that can be accessed and/or managed by other components in the environment 200, such as by the SMF 104.

In general, the NEF 202 can be implemented as a network function including functionality to securely expose services and/or capabilities provided by and amongst the various network functions, as discussed herein. In some instances, the NEF 202 receives information from other network functions and can store the received information as structured data using an interface to a data storage network function.

In general, the AUSF 204 can be implemented as a network function including functionality to provide authentication to various devices in the network. For example, the AUSF 204 can request device credentials (e.g., security key(s)), verify that a device is authorized to connect to a network, and/or control access to the network based on the device credentials.

In general, the NRF 206 can be implemented as a network function including functionality to support service discovery (e.g., receive a network function discovery request and provide information associated with the discovered network function instances to a requesting entity). In some instances, the NRF 206 can receive utilization information, capability information, etc. from various network functions, such as the UPFs 110(1), 110(2), . . . , 110(N), to provide such utilization information to the other components discussed herein. Further, the NRF 206 can select, assign, implement, or otherwise determine network functions to be used in a network based at least in part on utilization information, as discussed herein.

In general, the AMF 208 can be implemented as a network function including functionality to provide UE-based authentication, authorization, mobility management, etc., to various UEs. In some instances, the AMF 208 can include functionality to terminate a radio access network (RAN) control plane interface between the UE 102 and other functions on the network. In some instances, the AMF 208 can include functionality to perform registration management of the UE 102 in a network, connection management, reachability management, mobility management, access authentication, access authorization, security anchor functionality (e.g., receiving and/or transmitting security keys during registration/authorization), and the like.

In general, the UDM 210 can be implemented as a network function including functionality to process authentication credentials, handle user identification processing, manage registration and/or mobility, manage subscriptions between a UE and a carrier, and/or manage SMS (short message service) data.

In general, the AF 216 can be implemented as a network function including functionality to route traffic to/from applications operating on the network, facilitate accessing the network exposure function (NEF) 202, and interact with the policy framework for policy control in connection with the PCF 106.

In general, the (R)AN 212 can be implemented as a variety of technologies to provide wired and/or wireless access to the network, as discussed herein. In some instances, the (R)AN 212 (also referred to as a RAN 212) can include a 3GPP RAN, such a GSM/EDGE RAN (GERAN), a Universal Terrestrial RAN (UTRAN), or an evolved UTRAN (E-UTRAN), or alternatively, a "non-3GPP" RAN, such as a Wi-Fi RAN, or another type of wireless local area network (WLAN) that is based on the IEEE 802.11 standards. Further, the RAN 212 can include any number and type of base stations representing any number and type of macrocells, microcells, picocells, or femtocells, for example, with any type or amount of overlapping coverage or mutually exclusive coverage.

In general, the DN 214 can include any public or private network(s), such as the internet.

In general, the AF 216 can be implemented as a network function including functionality to route traffic to/from applications operating on the network, facilitate accessing the network exposure function (NEF) 202, and interact with the policy framework for policy control in connection with the PCF 106.

In general, the signaling system 218 can be implemented as a technology configured to select a user plane system 220(1), 220(2), . . . , 220(M) to provide services to the UE 102 based at least in part on latency information received from the user plane systems 220(1), 220(2), . . . , 220(M). Although illustrated as including various components, the signaling system can include the SMF 104 without including the NEF 202, the AUSF 204, the NRF 206, the AMF 208, the PCF 106, and the UDM 210, for example.

In general, the user plane systems 220(1), 220(2), . . . , 220(M) can be implemented as a technology configured to report latency information to the signaling system 218, and to provide services to the UE 102 upon request by the signaling system 218.

In general, the data structure 230 can store latency information received by the signaling system from the user plane systems 220(1), 220(2), ..., 220(M). In various embodiments, the data structure 230 is a table. The data structure 230 can include multiple entries 232. In some implementations, one of the entries 232 stores latency information corresponding to one of the user plane systems 220(1), 220(2), ..., 220(M). For example, one of the entries 232 includes a user plane system ID 234 of one of the user plane systems 220(1), 220(2), ..., 220(M), and an indication 236 of a latency reported by the user plane system corresponding to the user plane system ID 234. The signaling system 218 can be configured to manage and/or edit the data structure 230. Although illustrated as separate from the signaling system 218, in some embodiments, the data structure 230 can be stored at a local memory of the signaling system 218.

In general, the SMF 104 can receive latency information from the user plane systems 220(1), 220(2), ..., 220(M), and select the lowest-latency user plane system to fulfill a priority request based on the received latency information. In some embodiments, the SMF 104 can store the received latency information in the data structure 230 by updating the data structure 230, and can select the lowest-latency user plane system by accessing and comparing the entries 232 in the data structure 230. As discussed herein, the systems, devices, and techniques discussed herein are not limited to selecting a user plane system of a plurality of user plane systems, for example.

In general, the devices and network functions illustrated in the environment 200 can be communicatively coupled via one or more control planes which can pass controls and signaling by and between the various components discussed herein. Further, the environment 200 can include a plurality of each of the various functions (e.g., the SMF 104 can represent a plurality of SMFs, for example). The environment 200 can further include additional functions and is not limited to those represented in FIG. 2.

Although environment 200 is illustrated as using a fifth generation (5G) architecture, components of the environment 200 can be implemented using other types of network architectures, such as a long term evolution (LTE) control and user plane separation of enterprise product structure (EPS) nodes (CUPS) architecture. In a specific example, the signaling system 218 and/or the SMF 104 can comprise a packet data network (PDN) gateway-C (PGW-C); each one of the user plane systems 220(1), 220(2), ..., 220(M) and/or each of the UPFs 110(1), 110(2), ..., 110(N) can comprise a serving gateway-U (SGW-U) node, a packet data network (PDN) gateway-U (PGW-U) node, or both; and the PCF 106 can comprise a policy and charging rules function (PCRF).

Figure 3:
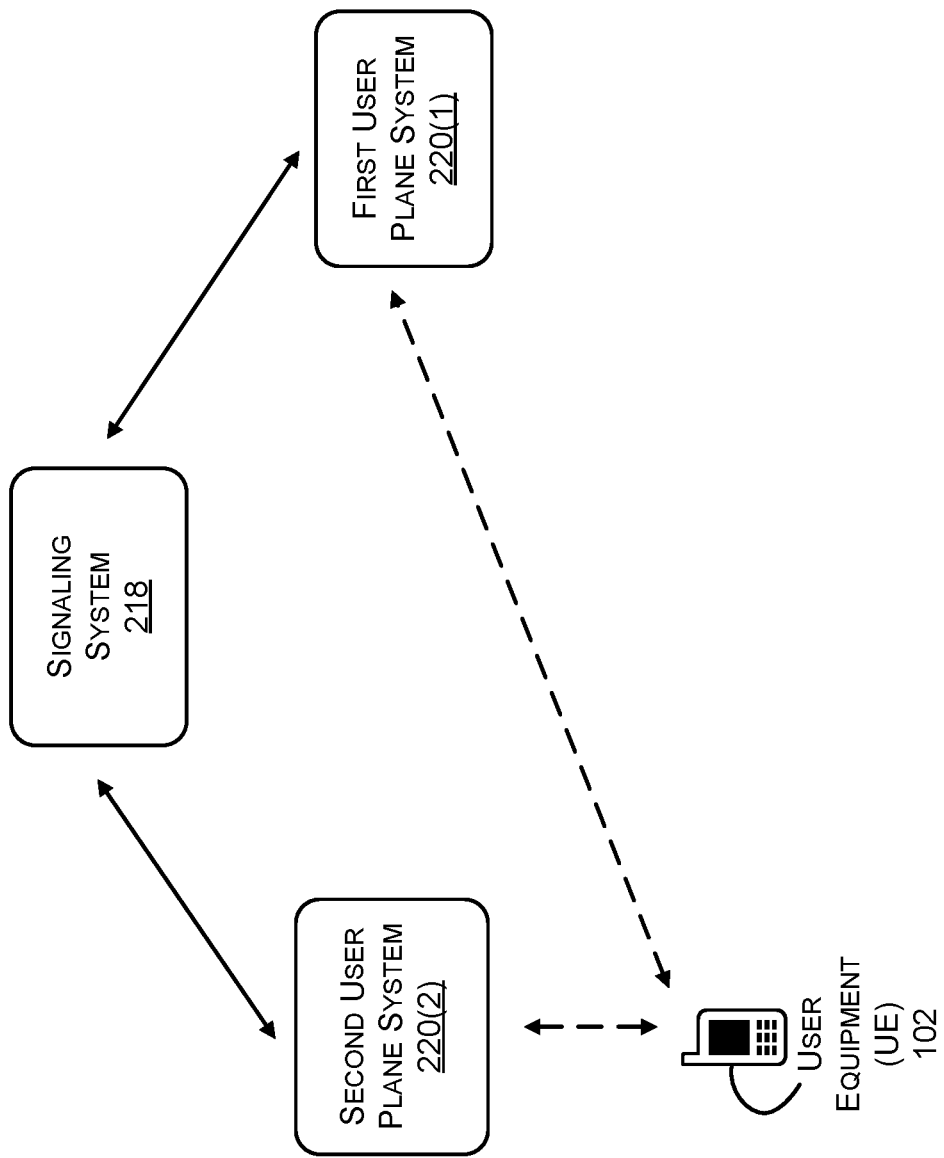
FIG. 3 illustrates an example environment including a UE in different proximities to user plane systems, which are connected to a common signaling system.

FIG. 3 illustrates an example environment including a UE in different proximities to various user plane systems, which are connected to a common signaling system.

As described herein, the UE 102 can send a priority request for services to the signaling system 218. In response, the signaling system 218 selects an appropriate user plane system 220(1) or 220(2) to provide services to the UE 102.

The signaling system 218 can select the user plane system 220(1) or 220(2) based at least in part on proximity. As represented by the dotted arrows in FIG. 3, the second user plane system 220(2) is in closer proximity to the UE 102 than the first user plane system 220(1). For example, a hardware component of the second user plane system 220(2) may be located in the same metropolitan area as the UE 102, and a hardware component of the first user plane system 220(1) may be located outside of the metropolitan area.

However, the second user plane system 220(2) may be slower at providing services to the UE 102 than the first user plane system 220(1). For example, the second user plane system 220(2) is experiencing congestion, mechanical failure, or the like, while the first user plane 220(1) is operating below capacity.

In various embodiments of the present disclosure, the signaling system 218 selects the user plane system 220(1) or 220(2) based at least partly on latency measurements, rather than based on proximity alone. In some instances, each of the first and second user plane systems 220(1) and 220(2) measures a latency toward a radio access network and transmits an indication of the latency to the signaling system 218 in the form of latency information. The signaling system 218 can use the received latency information to determine the lowest-latency user plane system 220(1) or 220(2), and to direct data traffic to and from the UE 102 through the lowest-latency user plane system 220(1) or 220(2). In some implementations, the signaling system 218 selects the user plane system 220(1) or 220(2) for providing services to the UE 102 based on proximity, latency, and other factors affecting the quality of service (QoS) and/or quality of experience (QoS) at the UE 102.

Figure 4:
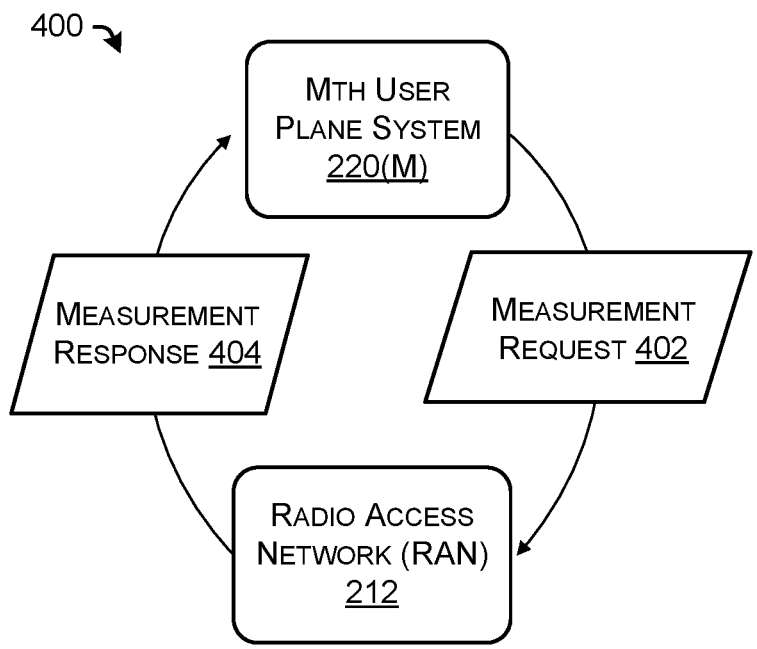
FIG. 4 illustrates an example of a user plane system measuring a latency over a link between the user plane system and a radio access network (RAN).

FIG. 4 illustrates an example process 400 of a user plane system measuring a latency over a link between the user plane system and a radio access network (RAN). An Mth user plane system 220(M) can transmit a measurement request 402 through a path including the radio access network (RAN) 212 over a link and receive a measurement response 404 through the path including the RAN 212 over the link. For example, the Mth user plane system 220(M) can transmit the measurement request 402 to equipment associated with the RAN 212, and may receive the measurement response 404 from the equipment. This equipment may be, for example, a RAN component. Based on a time delay associated with transmitting the measurement request 402 and/or receiving the measurement response 404, the Mth user plane system 220(M) can determine (or at least estimate) a latency over the link. The latency can depend on a round trip time (RTT), a one-way delay (OWD), or both, of the measurement request 402 and the measurement response 404. The Mth user plane system 220(M) can report the latency to a signaling system by transmitting latency information indicating the latency to the signaling system.

The latency can be measured in various ways. For example, the Mth user plane system 220(M) can record, in memory, a time the Mth user plane system 220(M) transmits the measurement request 402 and a time the Mth user plane system 220(M) receives the measurement response 404, and then calculate the delay based on the recorded times. In another example, the measurement request 402 includes its own transmission time in a payload, and the measurement response 404 includes both the transmission time of the measurement request 402 as well as a receipt time of the measurement request 402, so that the Mth user plane system 220(M) can determine the latency by reading the measurement response 404.

In some implementations, the measurement request 402 and the measurement response 404 are part of a ping operation corresponding to the transmission control (TCP)/internet protocol (IP) utility. For example, the measurement request 402 can be an echo request packet and the measurement response 404 can be an echo reply packet.

In some instances, the Mth user plane system 220(M) transmits measurement requests 402 and the RAN 212 transmits measurement responses 404, repeatedly, so that the Mth user plane system 220(M) can calculate the latency over the link and report the latency to the signaling system, repeatedly. For example, the Mth user plane system 220(M) pings the RAN 212 and calculates the latency periodically at a predetermined frequency. In some implementations, the process 400 is performed at a frequency that changes over time. In some instances, the Mth user plane system 220(M) may calculate and report latencies at a higher frequency during a first time period than during a second time period, where the network experiences greater data traffic during the first time period than the second time period. For example, the Mth user plane system 220(M) can calculate and report latencies at a higher rate during the day than during the night. In certain implementations, the process 400 is initiated when the Mth user plane system 220(M) receives, from a signaling system (e.g., signaling system 218), a request to report latency information. In certain embodiments, the Mth user plane system 220(M) calculates the latencies repeatedly, but only reports a measured latency when it is more than a threshold amount different from a previously measured latency.

Figure 5:
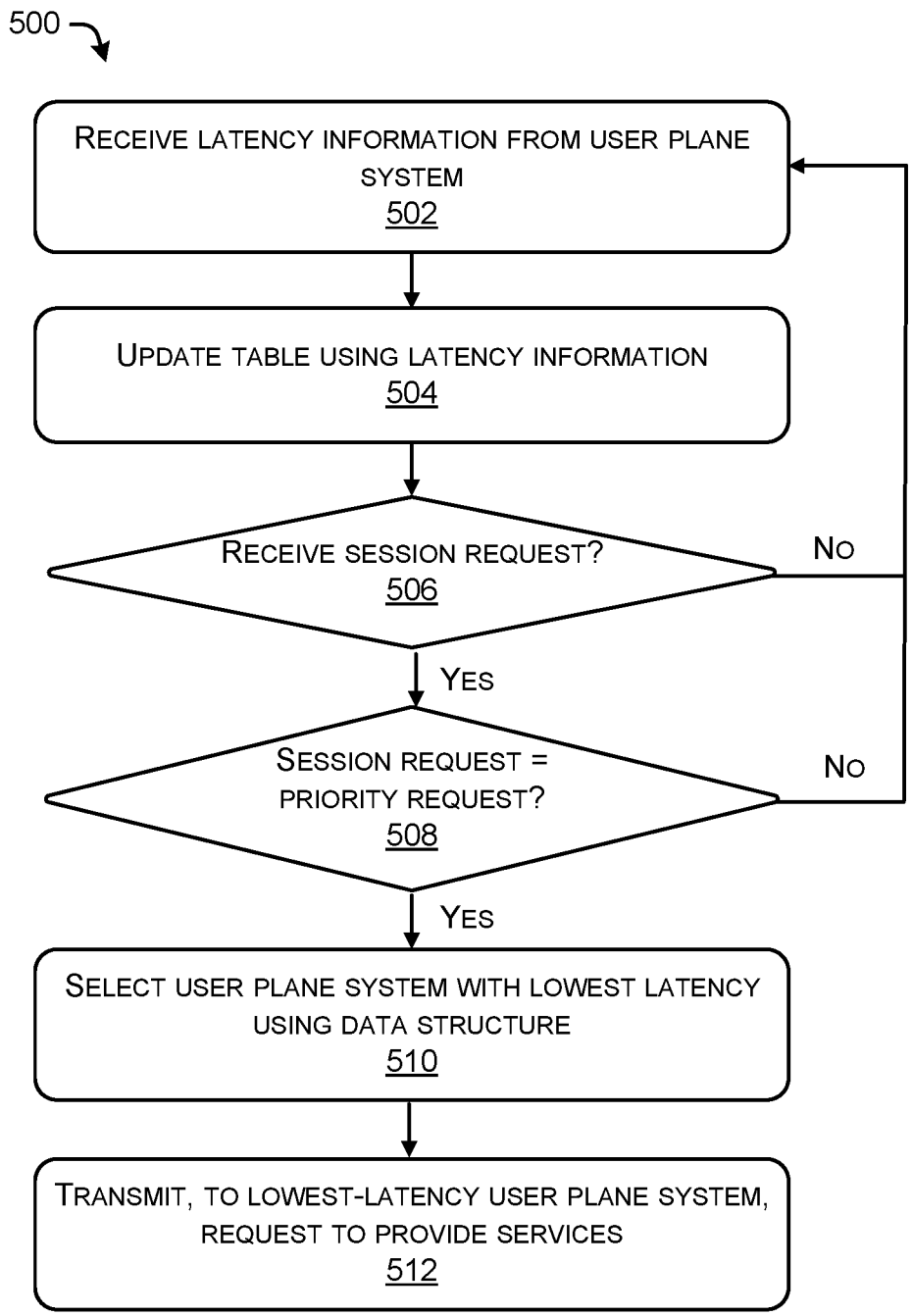
FIG. 5 illustrates an example process for selecting a user plane system based on latency information.
Figure 6:
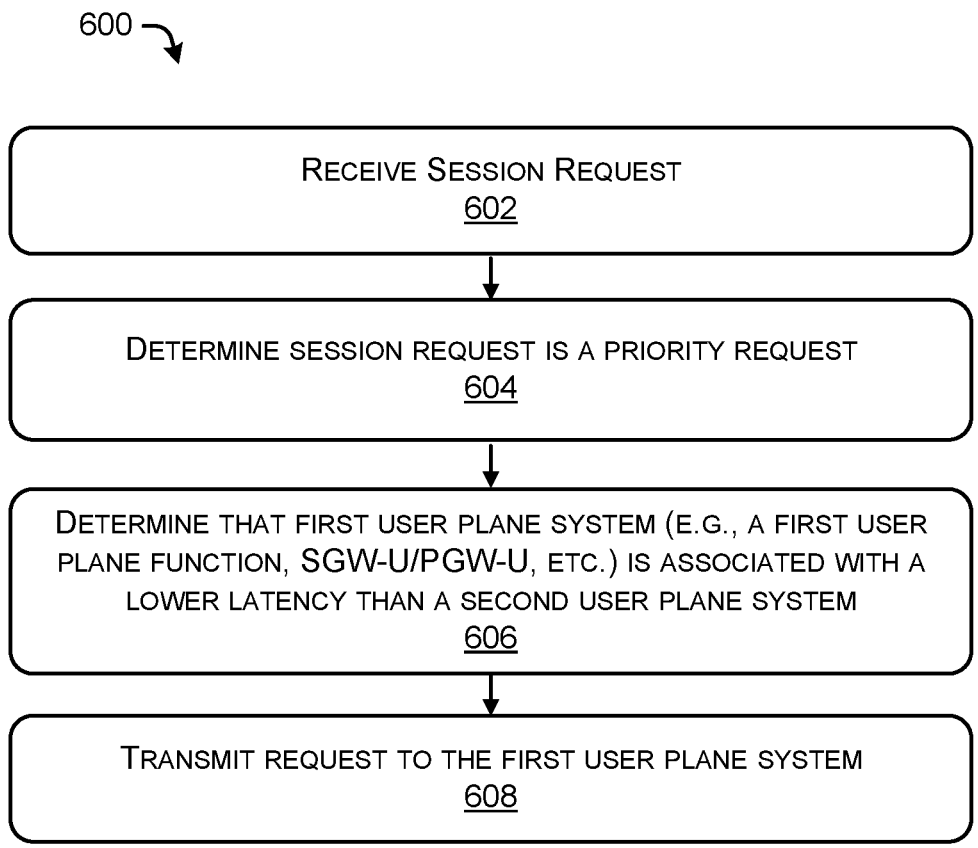
FIG. 6 illustrates another example process for selecting a user plane system based on latency information.
Figure 7:
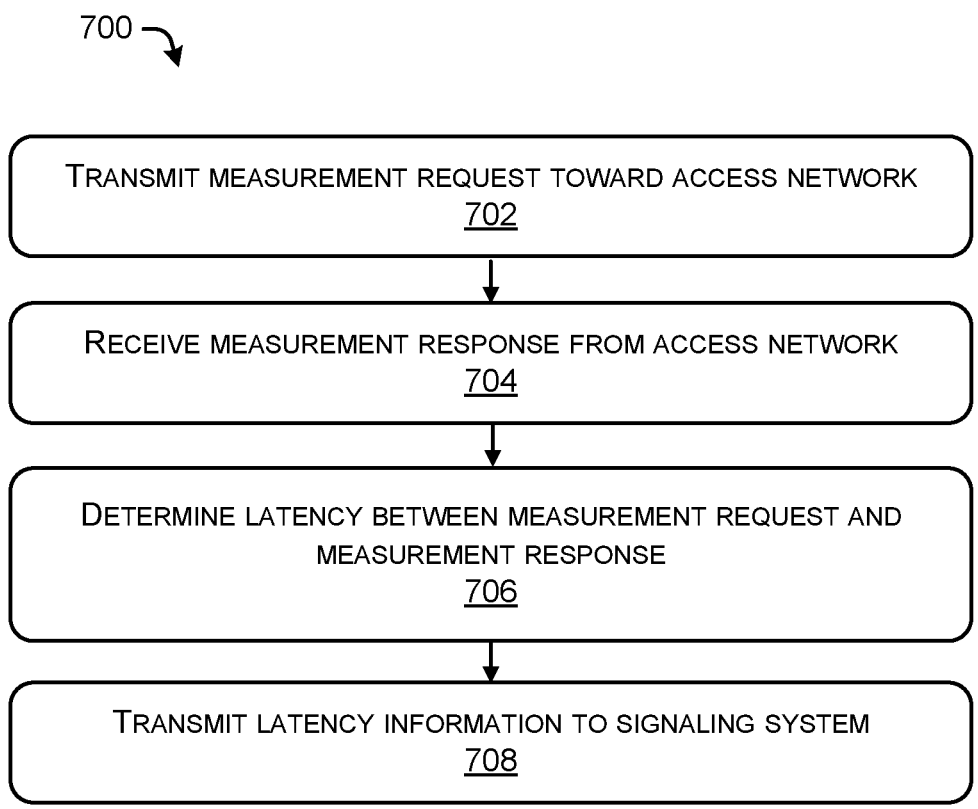
FIG. 7 illustrates an example process for reporting a latency of a user plane system to a signaling system.

FIGS. 5-7 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 5 illustrates an example process 500 for selecting a user plane system based on latency information. The example process 500 can be performed by the session management function (SMF) 104, the signaling system 218, or another component, in connection with other components discussed herein. Some or all of the process 500 can be performed by one or more devices or components in the environment 200, for example.

At operation 502, the process 500 can include receiving latency information from a user plane system, such as a user plane function (UPF). In one example, user plane systems in a network (e.g., user plane systems 220(1), 220(2), . . . , 220(M) or UPFs 110(1), 110(2), . . . , 110(N)) can transmit latency information to the SMF (e.g., the SMF 104). In some instances, the SMF 104 can request latency information from various user plane systems (or any network function) on a regular schedule, upon receipt of a request to initiate a communication, and the like. In some instances, the user plane systems (or any network function) can transmit latency information upon determining that a latency has changed more than a threshold amount compared to a previous latency. In a specific example, the user plane systems can transmit latency information upon determining that a congestion level has changed more than a threshold amount compared to a previously measured congestion level. In some instances, latency information can include, but is not limited to, an identification of the user plane system transmitting the latency information, and an indication of a latency measured by the user plane system. The identification of the user plane system can be, for example, an IP address of the user plane system. Further, in some instances, the operation 502 can include receiving latency information associated with multiple user plane systems.

At operation 504, the process 500 can include updating a data structure (e.g., data structure 230) using the latency information. In some instances, the data structure includes multiple entries. An entry may correspond to latency information associated with one of the user plane systems. In some cases, the data structure is a hash table indexed by user plane system identification. The data structure can be updated by identifying the entry corresponding to the identification of the user plane system in the latency information and overwriting a previously stored latency with the indication of the latency in the latency information. In some instances when no entry corresponds to the identification of the user plane system in the latency information, the data structure can be updated by adding a new entry including the identification and the indication of latency in the latency information.

At operation 506, the process 500 can include determining whether a session request (e.g., session request 118) has been received. In some instances, a session request can be received from a UE (e.g., UE 102). In example in which the process 500 is performed by an SMF, the session request can be forwarded from the UE to the SMF by an access and mobility management function (AMF) (e.g., AMF 208). If the session request has not been received, the process 500 returns to operation 502. If the session request has been received, the process 500 continues to operation 508.

At operation 508, the process 500 can include determining whether the session request is a priority request. In some instances, the session request is determined to be a priority request when the session request is a request for a latency-sensitive application (e.g., for emergency services, for live video streaming, and the like), when the LIE originating the session request is identified as being associated with a premium subscription, or both. In some embodiments, the session request is determined to be a priority request when an indication of the priority request (e.g., priority request indication 120) is received (e.g., from PCF 106). If the session request is determined to not be a priority request, the process 500 returns to operation 502. If the session request is determined to be a priority request, the process continues to operation 510. Although not depicted in FIG. 5, in some embodiments, the process continues to operation 510 when the one or more devices or components performing process 500 are operating under a certain level of capacity, regardless of whether the session request is a priority request.

At operation 510, a lowest-latency user plane system (e.g., one of user plane systems 220(1), 220(2), . . . , 220(M)) is selected using a data structure (e.g., data structure 230). In some instances, an entry in the data structure storing the lowest indication of latency is determined and the user plane system identified in the entry is selected as the lowest-latency user plane system.

In some embodiments, one or more entries in the data structure are ignored in operation 510. For example, when an entry has not been updated for a predetermined time, the user plane system identified in the entry is not selected as the lowest-latency user plane. Accordingly, in instances where a malfunctioning user plane system does not report updated latency information, the malfunctioning user plane system can be ignored.

Subsequently, a request to provide services (e.g., services request 122) is transmitted to the lowest-latency user plane system at operation 512. The instruction may include an identification of the UE, for example. In some instances, the user plane system subsequently provides services (e.g., services 124) from a data network (e.g., data network 214) to the UE in response to receiving the request.

FIG. 6 illustrates another example process 600 for selecting a user plane system based on latency information. The example process 600 can be performed by the session management function (SMF) 106, the signaling system 218, or another component, in connection with other components discussed herein. Some or all of the process 600 can be performed by one or more devices or components in the environment 200, for example.

At operation 602, the process 600 can include receiving a session request (e.g., session request 118) from a UE (e.g., UE 102). In some instances, the operation 602 can include being forwarded the session request from an access and mobility management function (AMF) (e.g., AMF 208) that is communicatively coupled with the UE.

At operation 604, the process 600 can include determining that the session request is a priority request. In some instances, the session request is determined to be a request for a latency-sensitive application (e.g., for emergency services, live streaming video, etc.), is determined to originate from a UE associated with a premium subscription, or both. In some embodiments, the session request is determined to be a priority request when an indication of the priority request (e.g., priority request indication 120) is received (e.g., from PCF 106).

At operation 606, a first user plane system (e.g., first user plane function (UPF) 110(1)) is determined to be associated with a lower latency than a second user plane system (e.g., second UPF 110(2)). In various embodiments, both the first user plane system and the second user plane system are configured to provide services to the UE. In some instances, the first user plane system is determined to be associated with the lower latency by accessing a data structure storing latency information that was previously reported by the first user plane system and the second user plane system. In certain instances, the first user plane system is determined to be the lowest-latency user plane system among multiple user plane systems including first user plane system and the second user plane system.

At operation 608, an instruction (e.g., services request 122) is transmitted to the first user plane system. The instruction can request the first user plane system to provide services to the UE originating the session request.

FIG. 7 illustrates an example process for reporting a latency of a user plane system to a signaling system. The example process 700 can be performed by any of the user plane functions (UPFs) 110(1), 110(2), . . . , 110(N), any of the user plane systems 220(1), 220(2), . . . , 220(M), or another component, in connection with other components discussed herein. Some or all of the process 700 can be performed by one or more devices or components in the environment 200, for example.

At operation 702, the process 700 can include transmitting a measurement request (e.g., measurement request 402) over a path that includes an access network. The network can be, for example, a radio access network (RAN). The path can include a link connecting the user plane system performing process 700 to the access network.

At operation 704, the process 700 can include receiving a measurement response (e.g., measurement response 404). The measurement response may be transmitted over the same path as the measurement request. For example, if process 700 is performed by a first device, the measurement response may be transmitted to the first device from a second device over the access network, wherein the first device and the second device are separated from each other by the access network. In some instances, operations 702 and 704 are part of a pinging operation, where the measurement request is an echo request packet and the measurement response is an echo response packet.

At operation 706, the process 700 can include determining a latency between the measurement request and the measurement response. For example, the latency can relate to a time period between a time at which the measurement request is transmitted and a time at which the measurement response is received. In various implementations, the latency is an estimated round trip time (RTT) or one-way time (OWT) associated with the measurement request and/or the measurement response traversing the path including the access network.

At operation 708, the process 700 can include transmitting latency information to a signaling system. The latency information can include an identification of the component performing the process 700 (e.g., one of the user plane systems 220(1), 220(2), . . . , 220(M)) and an indication of the latency determined at operation 706. The identification of the component can be, for example, an IP address of the component. In various embodiments, the indication of the latency can be represented by a measurement of the time period between the measurement request and the measurement response, an indication of whether the time period is greater than a predetermined delay, an indication of whether the time period is greater than a level that can change over time (e.g., a level that is higher during the daytime and lower during nighttime), or any other representation of the time period. In some instances, the latency information is transmitted over the same access network accessed in operations 702 and 704, a different access network, or a combination thereof.

In some instances, process 700 is repeatedly performed. For example, process 700 can be performed periodically. In some instances, process 700 is performed at a frequency that changes over time. In certain embodiments, process 700 is performed more frequently during a first time of day (e.g., a time that overlaps with daytime hours) than a second time of day (e.g., a time that overlaps with nighttime hours), where previous user traffic trends indicate that congestion is less likely during the first time of day than the second time of day.

Figure 8:
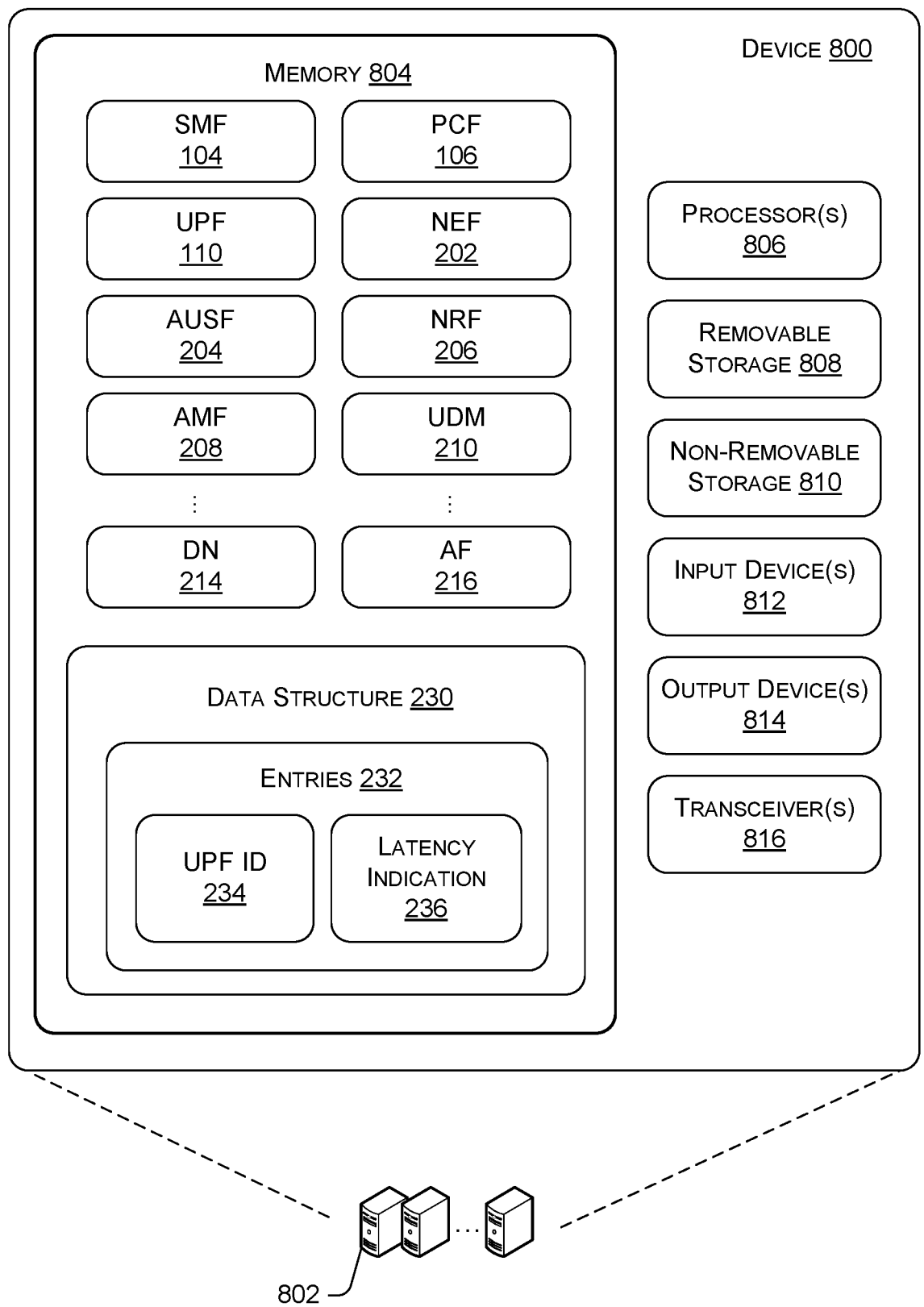
FIG. 8 illustrates an example device to implement the user plane system selection based on latency, as described herein.

FIG. 8 illustrates an example device 800 to implement the function selection based on utilization levels, as described herein. In some embodiments, some or all of the functionality discussed in connection with FIGS. 1-7 can be implemented in the device 800. Further, the device 800 can be implemented as a server computer 802, a network element on a dedicated hardware, as a software instance running on a dedicated hardware, or as a virtualized function instantiated on an appropriate platform, such as a cloud infrastructure, and the like. It is to be understood in the context of this disclosure that the device 800 can be implemented as a single device or as a plurality of devices with components and data distributed among them.

As illustrated, the device 800 comprises a memory 804 storing the session management function (SMF) 104, the policy control function (PCF) 106, the user plane function (UPF) 110, the network exposure function (NEF) 202, the authentication server function (AUSF) 204, the network resource function (NRF) 206, the access and mobility management function (AMF) 208, the unified data management (UDM) 210, the data network (DN) 214, and the application function (AF) 216, and to provide functionality to the device 800 to facilitate improved user plane system selection based on latency, as described herein. In various embodiments, the memory 804 may also comprise additional functions and structures that are not explicitly described herein. Also, the device 800 includes processor(s) 806, a removable storage 808 and non-removable storage 810, input device(s) 812, output device(s) 814, and transceiver(s) 816.

The device 800 can also include the latency information data structure 230, which may include multiple entries 232. In various embodiments, the data structure 230 is a table. In some instances, one of the entries 232 corresponds to one piece of latency information received from the UPF 110. That is, the entry 232 includes an identification 234 of the UPF 110 and an indication of a latency 236 of the UPF 110. In some embodiments, each one of the entries 232 corresponds to a piece of latency information received from a different UPF (e.g., UPFs 110(1), 110(2), . . . , 110(N)) or from a different user plane system (e.g., user plane systems 220(1), 220(2), . . . , 220(M)). The latency information data structure 230 is managed, for example, by the SMF 104. The SMF 104 can read, write, and/or access the entries 232 in the latency information data structure 230.

Aspects of the session management function (SMF) 104, the policy control function (PCF) 106, the user plane function (UPF) 110, the network exposure function (NEF) 202, the authentication server function (AUSF) 204, the network resource function (NRF) 206, the access and mobility management function (AMF) 208, the unified data management (UDM) 210, the data network (DN) 214, and the application function (AF) 216 are discussed above with connection with at least FIGS. 1 and 2. In general, these functions comprise aspects of a fifth generation (5G) mobile network.

In various embodiments, the memory 804 is volatile (such as RAM), non-volatile (such as ROM, flash memory, etc.) or some combination of the two. The session management function (SMF) 104, the policy control function (PCF) 106, the user plane function (UPF) 110, the network exposure function (NEF) 202, the authentication server function (AUSF) 204, the network resource function (NRF) 206, the access and mobility management function (AMF) 208, the unified data management (UDM) 210, the data network (DN) 214, and the application function (AF) 216 stored in the memory 804 can comprise methods, threads, processes, applications or any other sort of executable instructions. The session management function (SMF) 104, the policy control function (PCF) 106, the user plane function (UPF) 110, the network exposure function (NEF) 202, the authentication server function (AUSF) 204, the network resource function (NRF) 206, the access and mobility management function (AMF) 208, the unified data management (UDM) 210, the data network (DN) 214, and the application function (AF) 216 can also include files and databases.

In some embodiments, the processor(s) 806 is a central processing unit (CPU), a graphics processing unit (GPU), or both CPU and GPU, or other processing unit or component known in the art.

The device 800 also includes additional data storage devices (removable and/or non-removable) such as, for example, magnetic disks, optical disks, or tape. Such additional storage is illustrated in FIG. 8 by removable storage 808 and non-removable storage 810. Tangible computer-readable media can include volatile and nonvolatile, removable and non-removable media implemented in any method or technology for storage of information, such as computer readable instructions, data structures, program modules, or other data. Memory 804, removable storage 808 and non-removable storage 810 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the device 800. Any such tangible computer-readable media can be part of the device 800.

The device 800 also can include input device(s) 812, such as a keypad, a cursor control, a touch-sensitive display, voice input device, etc., and output device(s) 814 such as a display, speakers, printers, etc. These devices are well known in the art and need not be discussed at length here.

As illustrated in FIG. 8, the device 800 also includes one or more wired or wireless transceiver(s) 816. For example, the transceiver(s) 816 can include a network interface card (NIC), a network adapter, a local area network (LAN) adapter, or a physical, virtual, or logical address to connect to the various base stations or networks contemplated herein, for example, or the various user devices and servers. To increase throughput when exchanging wireless data, the transceiver(s) 816 can utilize multiple-input/multiple-output (MIMO) technology. The transceiver(s) 816 can comprise any sort of wireless transceivers capable of engaging in wireless, radio frequency (RF) communication. The transceiver(s) 816 can also include other wireless modems, such as a modem for engaging in Wi-Fi, WiMAX, Bluetooth, or infrared communication.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
   one or more processors;
   a memory; and
   one or more components stored in the memory and executable by the one or more processors to perform operations comprising:
      receiving, from a user device, a session request;
      determining that the session request is latency-sensitive;
      receiving, from a first user plane system, first latency information identifying the first user plane system and a first latency associated with the first user plane system;
      receiving, from a second user plane system, second latency information identifying the second user plane system and a second latency associated with the second user plane system;
      storing the first latency information and the second latency information in a data structure;
      determining that the first latency is a lowest latency; and
      transmitting, to the first user plane system, a request to provide services from a data network to the user device in response to determining that the first latency associated with the first user plane function is the lowest latency indicated in a plurality of entries of the data structure.

2. The system of claim 1, the operations further comprising:
receiving, from an access and mobility management function (AMF), the session request,
wherein determining that the session request is latency-sensitive includes receiving, from a policy control function (PCF), an indication that the session request is latency-sensitive.

3. The system of claim 1, the operations further comprising:
periodically receiving, from the first user plane system, updated latency information; and
updating the data structure with the updated latency information.

4. A method comprising:
receiving, from a user device, a session request;
receiving, from a first user plane system, first latency information identifying the first user plane system and a first latency associated with the first user plane system;
receiving, from a second user plane system, second latency information identifying the second user plane system and a second latency associated with the second user plane system;
determining that the first user plane system is associated with a lower latency than the second user plane system; and
transmitting, to the first user plane system and based at least in part on the session request, a request to provide services to the user device in response to determining that the first user plane system is associated with the lower latency than the second user plane system.

5. The method of claim 4,
wherein determining that the first user plane system is associated with the lower latency than the second user plane system includes comparing the first latency information and the second latency information.

6. The method of claim 5, further comprising:
storing the first latency information in a first entry of a data structure; and
storing the second latency information in a second entry of the data structure,
wherein determining the first user plane system is associated with the lower latency than the second user plane system further includes accessing the first latency information and the second latency information from the data structure.

7. The method of claim 4, further comprising:
determining the session request is a priority request.

8. The method of claim 7, wherein determining the session request is the priority request includes determining the session request is latency-sensitive.

9. The method of claim 7, wherein determining the session request is the priority request includes receiving an indication that user device is associated with a premium subscription service.

10. The method of claim 4, wherein the session request is received via a radio access network (RAN).

11. The method of claim 4, wherein the first user plane system is a first user plane function and the second user plane system is a second user plane function.

12. The method of claim 11, further comprising:
determining the session request is a priority request by receiving, from a policy control function (PCF), an indication that the session request is latency-sensitive,
wherein receiving, from the user device, the session request includes receiving the session request via a radio access network (RAN) and an access and mobility management function (AMF).

13. The method of claim 4, wherein the first user plane system includes at least one of a first serving gateway (SGW) node or a first packet data network (PDN) gateway (PGW) node,
wherein the second user plane system includes at least one of a second SGW node or a second PGW node.

14. The method of claim 13, further comprising:
determining the session request is a priority request by receiving, from a policy and charging rules function (PCRF), an indication that the session request is latency-sensitive.

15. A computing device, comprising:
one or more processors;
a memory; and
one or more components stored in the memory and executable by the one or more processors to perform operations comprising:
receiving, from a user device, a session request;
determining that the session request is latency-sensitive;
receiving, from a first user plane system, first latency information identifying the first user plane system and a first latency associated with the first user plane system;
receiving, from a second user plane system, second latency information identifying the second user plane system and a second latency associated with the second user plane system;
storing the first latency information and the second latency information in a data structure;
determining that the first latency is a lowest latency; and
transmitting, to the first user plane system, a request to provide services from a data network to the user device in response to determining that the first latency associated with the first user plane function is the lowest latency indicated in a plurality of entries of the data structure.

16. The computing device of claim 15, the operations further comprising:
receiving, from an access and mobility management function (AMF), the session request,
wherein determining that the session request is latency-sensitive includes receiving, from a policy control function (PCF), an indication that the session request is latency-sensitive.

17. The computing device of claim 15, the operations further comprising:
periodically receiving, from the first user plane system, updated latency information; and
updating the data structure with the updated latency information.

18. The computing device of claim 15,
wherein determining that the first user plane system is associated with the lowest latency than the second user plane system includes comparing the first latency information and the second latency information.

19. The computing device of claim 18, further comprising:

storing the first latency information in a first entry of a data structure; and storing the second latency information in a second entry of the data structure, wherein determining the first user plane system is associated with the lowest latency than the second user plane function further includes accessing the first latency information and the second latency information from the data structure.

20. The computing device of claim 15, further comprising determining the session request is a priority request.

* * * * *